United States Patent
Isom et al.

(10) Patent No.: US 10,023,305 B2
(45) Date of Patent: Jul. 17, 2018

(54) SYSTEM AND METHOD OF DETERMINING ROTOR LOADS AND MOTION

(75) Inventors: Joshua D. Isom, South Windsor, CT (US); Sergey Shishkin, Marlborough, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 1005 days.

(21) Appl. No.: 13/468,698

(22) Filed: May 10, 2012

(65) Prior Publication Data

US 2013/0304400 A1  Nov. 14, 2013

(51) Int. Cl.
*B64C 27/00* (2006.01)
*G01L 5/13* (2006.01)
*G01P 15/00* (2006.01)

(52) U.S. Cl.
CPC .......... *B64C 27/006* (2013.01); *B64C 27/008* (2013.01); *G01L 5/133* (2013.01); *G01P 15/00* (2013.01)

(58) Field of Classification Search
CPC ............................ B64C 27/006; G01L 5/133
USPC .......................................................... 702/41
See application file for complete search history.

(56) References Cited

U.S. PATENT DOCUMENTS

| | | | |
|---|---|---|---|
| 3,938,762 A | 2/1976 | Murphy | |
| 6,192,759 B1 * | 2/2001 | Schoess | G01H 1/003 73/583 |
| 6,304,194 B1 * | 10/2001 | McKillip | 340/962 |
| 6,356,857 B1 | 3/2002 | Qin et al. | |
| 6,598,195 B1 | 7/2003 | Adibhatla et al. | |
| 7,532,988 B2 | 5/2009 | Khibnik et al. | |
| 8,868,284 B2 | 10/2014 | Isom et al. | |
| 2003/0060903 A1 * | 3/2003 | MacMartin | G05B 5/01 700/32 |
| 2008/0036617 A1 * | 2/2008 | Arms et al. | 340/679 |
| 2009/0324409 A1 * | 12/2009 | Volanthen | G01B 11/18 416/61 |
| 2010/0095740 A1 * | 4/2010 | Walton | G01N 29/2481 73/23.2 |
| 2010/0219987 A1 * | 9/2010 | Isom et al. | 340/946 |
| 2010/0256953 A1 | 10/2010 | Kar | |
| 2011/0057071 A1 | 3/2011 | Sahasrabudhe et al. | |
| 2011/0119032 A1 | 5/2011 | Liu et al. | |
| 2011/0158806 A1 * | 6/2011 | Arms | F03D 1/0658 416/31 |
| 2012/0068003 A1 * | 3/2012 | Bajekal | B64C 27/008 244/17.11 |
| 2012/0179326 A1 * | 7/2012 | Ghelam | 701/31.9 |

(Continued)

OTHER PUBLICATIONS

De Bie, Tijl, Nello Cristianini, and Roman Rosipal. "Eigenproblems in Pattern Recognition." In Handbook of Geometric Computing, 129-167. Springer, 2005.

(Continued)

*Primary Examiner* — Ricky Ngon
(74) *Attorney, Agent, or Firm* — Cantor Colburn LLP

(57) ABSTRACT

A system for reconstructing sensor data in a rotor system that comprises a rotating component of the rotor system, a plurality of sensors in the rotating component to sense at least one of loads and motion characteristics in the rotating component and to generate sensor data, and an analysis unit to generate reconstructed sensor data from the sensor data using numerical analysis for low-rank matrices.

15 Claims, 12 Drawing Sheets

(56) References Cited

U.S. PATENT DOCUMENTS

2013/0179128 A1* 7/2013 Mazzaro et al. .................. 703/2
2013/0191425 A1* 7/2013 Porikli ................. G06K 9/6249
708/207

OTHER PUBLICATIONS

Fletcher, Jay W. "A Model Structure for Identification of Linear Models of the UH-60 Helicopter in Hover and Forward Flight." NASA, 1995, 90 pages.

Ganguli, Ranjan, and Inderjit Chopra. "Simulation of Helicopter Rotor-System Structural Damage, Blade Mistracking, Friction, and Freeplay." Journal of Aircraft, 1998: pp. 591-597.

Johnson, Wayne, "Helicopter Theory", New York: Dover, 1980, pp. 1-1120.

Lin, Zhouchen, Minming Chen, and Yi Ma. "The Augmented Lagrange Multiplier Method for Exact Recovery of Corrupted Low-Rank Matrices." Technical Report, University of Illinois at Urbana-Champaign, 2010, Urbana-Champaign, pp. 1-20.

Toh, Kim-Chuan, and Sangwoon Yun. "An accelerated proximal gradient algorithm for nuclear norm regularized linear least squares problems." Pacific Journal of Optimization, 2010: 31 pages.

Verdult, V., M. Lovera, and M. Verhaegen. "Identification of linear parameter-varying state-space models with application to helicopter rotor dynamics." International Journal of Control 77, No. 13 (2004): pp. 1149-1159.

Yuan, Ming, Ali Ekici, Zhaosong Lu, and Renato Monteiro. "Dimension reduction and coefficient estimation in multivariate linear regression." Journal of the Royal Statistical Society B, 2007: pp. 329-346.

Zhou, Z., X. Li, J. Wright, E. Candes, and Ma Y. "Stable principal component pursuit." 2010 IEEE International Symposium on Information Theory Proceedings. IEEE, 2010. 5 pages.

EP K 81 769/8; Application No./Patent No. 13158394.0-1757 / 2662741; European Search Report; dated Jun. 12, 2017, 12 pages.

Jie Cheng, et al.; "Efficient Data Collection With Sampling in WSNs: Making Use of Matrix Completion Techniques," Globecom 2010, 2010 IEEE Global Telecommunications Conference, IEEE, Piscataway, NJ, USA; Dec. 6, 2010; 5 Pages.

* cited by examiner

SYSTEM AND METHOD OF DETERMINING ROTOR LOADS AND MOTION

STATEMENT REGARDING FEDERALLY SPONSORED RESEARCH OR DEVELOPMENT

This invention was made with Government support under Agreement No. W911W6-10-2-0006 COST-A. The Government has certain rights in the invention.

BACKGROUND OF THE INVENTION

Embodiments of the present invention pertain to a system and method of determining rotor loads and motion. In particular, embodiments of the present invention pertain to a system and method of determining helicopter rotor loads and motion using numerical analysis for low-rank matrices.

Important rotor systems loads and motions include blade flap, blade pitch, blade lead lag, main rotor shaft bending, main rotor shaft torque, and pitch rod loads. Knowledge of helicopter rotor system loads and motion enables usage-based maintenance, life-improving control, structural health monitoring, aircraft vibration control, and individual blade control. The abundance of uses for loads and motion information has motivated the development of sensors for rotor system loads and motion as well as the development of virtual sensing algorithms.

BRIEF DESCRIPTION OF THE INVENTION

Disclosed is a system for validating and reconstructing sensor data in a rotor system comprising a rotating component of the rotor system, a plurality of sensors in the rotating component to sense at least one of loads and motion characteristics in the rotating component, and an analysis unit to generate reconstructed sensor data from the plurality of sensors using numerical analysis for low-rank matrices.

Also disclosed is a method of reconstructing sensor data of a rotor system, comprising collecting sensor data from sensors in a rotating component of a rotor system and generating reconstructed loads and motion data of the rotating component using numerical analysis for low-rank matrices.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus is presented herein by way of exemplification and not limitation with reference to the Figures.

Figure 1:
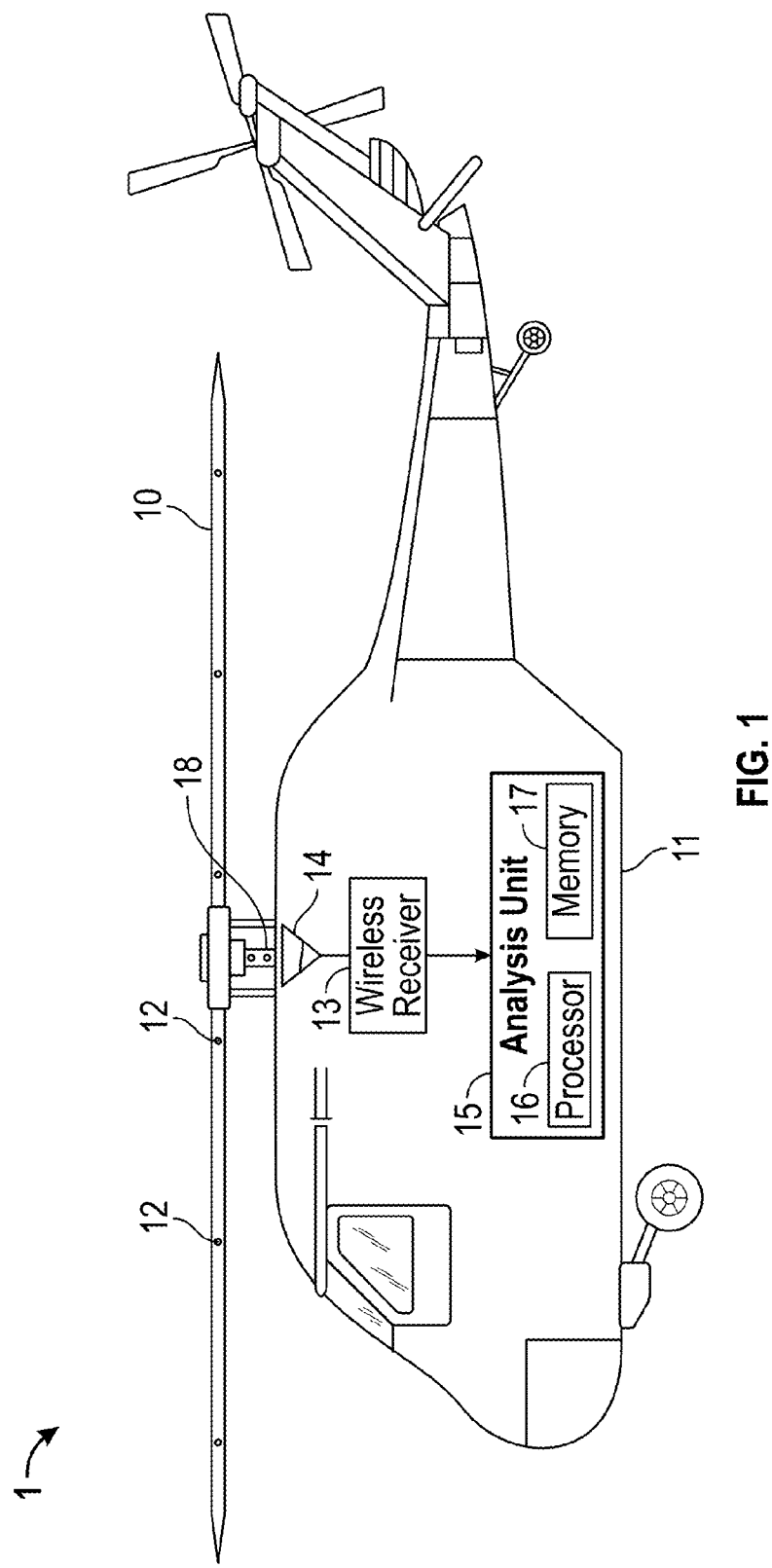
FIG. 1 is a diagram of a system for determining rotor loads and motion according to one embodiment of the invention.

FIG. 1 illustrates a system 1 for determining rotor loads and motion in a vehicle, particularly in a rotary wing aircraft, such as a helicopter. The system includes a plurality of sensors 12 in the rotor blades 10 and the rotor shaft 18. The sensors 12 may include wireless transmitters to transmit data wirelessly to an antenna 14 and receiver 13. The sensors 12 may include, for example, strain gauges, magnetic Hall Effect sensors, temperature sensors, pressure sensors, magnetorestrictive sensors, accelerometers, and rate gyros. The sensors 12 monitor the rotor blades 10 and shaft 18 to sense the loads and motion of the blades 10 and shaft 18, and the effect of perturbations in the aircraft state on the blades 10 and shaft 18. In the present specification and claims, perturbations in aircraft state result in changes in the loads and motion of the blades 10 and shaft 18 including changes in blade flap, blade pitch, blade lead lag, main rotor shaft bending, main rotor shaft torque, and pitch rod loads, for example.

In exemplary embodiments, the wireless signals output from the sensors 12 are low-power wireless signals to prevent interference with control systems of the helicopter or to prevent detection of the helicopter from external sensors, such as ground-based receivers or receivers of other aircraft. Embodiments of the present invention reconstruct sensor measurements lost or corrupted in wireless transmission, since the wireless signals may be subject to loss and error in transmission between the sensors 12 and the wireless receiver 13.

The receiver 13 transmits the sensed rotor data to an analysis unit 15, which includes a processor 16 to process the sensed data to replace and correct lost and erroneous data to accurately determine the loads and motion of the rotor blades 10. The analysis unit 15 may further include memory 17, supporting logic, and other circuitry necessary to analyze the sensor data and store and transmit the analyzed data. Examples of memory and supporting logic include hard disks, flash memory, volatile and non-volatile memory, field programmable gate arrays, multiplexers, and other memory and logic circuitry. According to one embodiment, the analysis unit 15 is located within the body 11 of the helicopter. According to an alternative embodiment, the analysis unit 15 is external to the helicopter. For example, the wireless receiver 13 may include a wireless transmitter, and the wireless transmitter may transmit the sensor data to an external analysis unit.

According to embodiments of the present invention, sensor data from the sensors 12 may be analyzed by the analysis unit 15 using numerical analysis for low-rank matrices to correct erroneous data and to provide missing data. The fact that numerical analysis for low-rank matrices is appropriate in this context is due to four factors. First, in a system having a rotating component, such as the rotor blades 10 and shaft 18 of the helicopter, the data from the sensors in a rotating component is periodic. For example, the sensor data between one revolution and the next of the rotor blades 10 should be very similar if the state of the aircraft has not changed significantly. Second, sensor outputs in the rotor system of a helicopter are correlated with each other. For example, when the pitch of the rotor blades 10 is changed as a result of a pilot-initiated change in collective position, the output of the sensors will correlate with each other in the sense that the change in loads and motion induced by the change in collective is repeatable under any condition within the linear regime and proportional to the magnitude of the change in collective. Third, there is a large quantity of data gathered from multiple sensors over the period of one rotor revolution. Fourth, under a suitably broad range of flight conditions (a linear regime) the relationship between the state of the aircraft and the rotor loads and motion is a linear relationship. These four factors result in a loads and motion matrix that has a low rank.

The low rank nature of the loads and motion matrix enables powerful numerical techniques, which, in turn, may enable usage-based maintenance, life-improving control, structural health monitoring, aircraft vibration control, and individual blade control.

Whereas existing control models characterize linear relationships among aircraft states, and linear parameter-varying (LPV) models characterize linear relationships with the rotor system, the model described in the present embodiments is a framework for the linear relationship between the state variables of the aircraft and rotor loads and motion. The model adopted here is simpler than the LPV model adopted for the analysis of individual blade control, and relies only on the basic properties of differentiable quasi-periodic functions.

Throughout the description below, italicized lower-case letters represent scalar variables, italicized upper-case letters represent matrices, and bold italicized lower-case letters represent vectors. The symbols j and k are used to signify integer indices, whereas the symbol i is the imaginary unit for complex numbers. Certain constants are associated with application of the invention to a particular helicopter system: m, the number of aircraft states; n, the number of sensors for rotor loads and motion; and p, the number of samples collected per sensor per revolution of the main rotor.

In forward flight, rotor loads and motion are a periodic function of the rotor azimuth position $\psi$. Thus any rotor load or motion variable y, as observed under a given aircraft state x, is a quasi-periodic function of $\psi$ and has a Fourier series expansion:

$$y(\psi) = a_0(x) + \Sigma_{k=1}^{\infty}(a_k(x)\cos k\psi + b_k(x)\sin k\psi) + \eta$$

where $\eta$ is non-periodic noise. Equivalently, using a complex representation with complex coefficients $c_k$, $$y(\psi) = \Sigma_{k=-\infty}^{\infty} c_k(x) e^{ik\psi} + \eta, \; c_k = \overline{c_{-k}}. \quad (1)$$

The complex Fourier coefficients which fully characterize a rotor system load or motion can be expressed as a function of the aircraft state vector x, a function which has a Taylor series expansion around some reference point r (m being the number of state variables):

$$c_k(x) = c_k(r) + \frac{\partial c_k}{\partial x_1}(r)(x_1 - r_1) + \ldots + \frac{\partial c_k}{\partial x_m}(r)(x_m - r_m) + h_k(x)|x - r|,$$

$$\lim_{x \to r} h(x) = 0.$$

Examples of aircraft state variables which are components of x include pilot inputs, airspeed vector components, attitude, and attitude rates.

Within a linear regime, any rotor load or motion has a linear approximation $\widetilde{y(\psi)}$ around the chosen reference point:

$$\widetilde{y(\psi)} = y_{ref}(\psi) + \Sigma_{k=1}^{m} z_k(\psi) u_k \quad (2)$$

where $u_k = x_k - r_k$ is the perturbation for the kth helicopter state. By equation (1), the reference load or motion waveform $y_{ref}(\psi)$ and its perturbation modes $\{z_k(\psi)\}_{k=1}^{m}$ are given by:

$$y_{ref}(\psi) = \sum_{k=-\infty}^{\infty} c_k(r) e^{ik\psi},$$

$$z_k(\psi) = \sum_{j=-\infty}^{\infty} \frac{\partial c_j}{\partial x_k}(r).$$

If the jth load or motion is sampled at discrete azimuth positions 0, $\Delta\psi$, $2\Delta\psi$, . . . over one rotor revolution, then $y^j = [y(0), y(\Delta\psi), y(2\Delta\psi), \ldots, y(2\pi - \Delta\psi)]$ and (2) can be written in vector form as:

$$y^j = y_{ref}^j + \Sigma_{k=1}^{m} z_k^j u_k.$$

The linearization error for a particular load at a particular azimuth position be expressed by $$y(\psi) - \widetilde{y(\psi)} = \Sigma_{k=-\infty}^{\infty} h_n(x) |x - r| e^{ik\psi} + \eta.$$

If $(\Sigma_{k=-\infty}^{\infty} |h_k(x)|^2)^{1/2} |x - r| + |\eta| \leq \psi \quad (2)$ then $\|y(\psi) - \widetilde{y(\psi)}\|_2 \leq \psi$.

An $\in$-linear regime for loads and motion is defined as a region of the aircraft state space in which the condition (2) is satisfied. In what follows, it is useful to define a loads and motion perturbation, the deviation of a loads and motion waveform from some reference waveform, as $w(\psi) = y(\psi) - y_{ref}(\psi)$.

Figure 2:
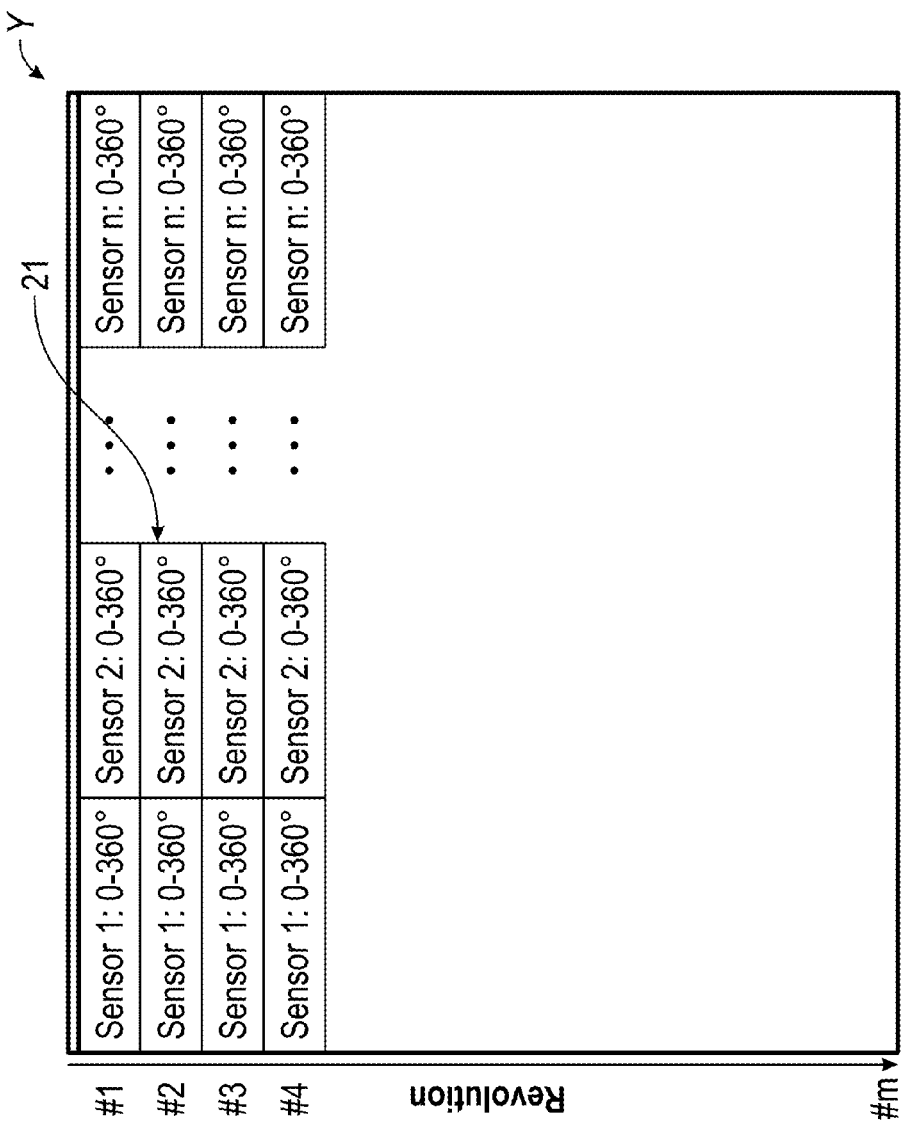
FIG. 2 illustrates the structure of the matrix of rotor loads and motion data according to one embodiment.

As illustrated in FIG. 2, for the purpose of numerical analysis for low-rank matrices it is useful to construct a loads and motion matrix Y, where each row of the matrix contains all of the loads and motion data $[y^1, y^2, \ldots y^n]$ for one rotor revolution—a row has data from n multiple loads and motion variables, all sampled at multiple azimuth positions through the same revolution. A loads and motion perturbation matrix W is constructed in the same way, using the loads and motion perturbations $w(\psi)$ for multiple loads, each sampled at multiple azimuth positions.

The matrices Y and W have a rank that is low relative to the number of columns of the matrix, provided that there is a modest number of loads and motion sensors available at a moderately high azimuthal sampling rate. For example, if there are 21 sensors in the rotor system sampled at a rate of 80 per rotor revolution, then the number of columns in the loads and motion perturbation matrix is 80*21=1680. In contrast, the number of aircraft states, which corresponds to the rank of the matrix in a linear regime, is often taken to be on the order of 20 to 30.

A consequence of a linear regime is that, regardless of the number of rows or columns of W, the rank of the matrix in the absence of nonlinearities, noise, or sensor faults, should be m, the number of aircraft degrees of freedom. The row space of W is spanned by the m perturbation mode vectors $[z_1^1, z_1^2, \ldots z_1^n], \ldots, [z_m^1, z_m^2, \ldots z_m^n]$.

Three powerful numerical methods that can be applied for analysis and estimation of rotor system loads and motion are 1) principal component pursuit, 2) matrix completion, and 3) nuclear-norm regularized multivariate linear regression. All methods are possible because of the low inherent rank of the loads and motion matrix for a linear regime.

According to embodiments of the present invention, the analysis unit 15 may be configured to receive from the receiver 13 sensor data, and may be configured to apply one or more numerical methods upon the received sensor data to estimate the rotor loads and motion. In particular, the analysis unit 15 may perform one or more of principal component pursuit, matrix completion, and nuclear-norm regularized multivariate linear regression to provide missing sensor data or to correct errors in the sensor data.

The analysis unit 15 may generate one or more matrices, such as the loads and motion matrix Y, and/or the loads and motion perturbation matrix W using the received sensor data. The analysis unit 15 may then perform the numerical analyses on the matrices Y and W to provide missing sensor data or to correct errors in the sensor data.

Principal component pursuit can be used to find noise, outliers, and nonlinearities that violate the characteristic low-rank structure of data in the loads and motion matrix.

In practice, the presence of noise and outliers in the data means that W has rank much larger than m. A recently formulated convex optimization problem allows one to decompose W as the sum W=L+S+N of a low rank matrix L, a sparse matrix S, and a dense but low magnitude noise matrix N.

The convex optimization problem is as follows:

minimize $\|L\|_* + \lambda \|S\|_1$ subject to $\|W - S - L\|_F \leq \delta$

If the approximate number of degrees of freedom m is known, and the magnitude of sensor noise known, then $\lambda$ and $\delta$ can be selected to yield L of rank m with a rowspace spanned by the linear perturbation modes. This estimate is robust to noise and sparse outliers, whereas the estimate produced by principal component analysis is sensitive to the presence of outliers. The entries of the sparse matrix S capture outliers due to sensor faults, blade impacts, or other rare events. Finally, N is an explicit estimate of low-magnitude noise associated with sensors or with small nonlinearities.

The term $\|S\|_1$, equal to the sum of the absolute values of S, is known as a sparsity-inducing norm because its use in an optimization problem tends to results in a small number of nonzero entries in the resulting optimal S. Other sparsity-inducing norms may be used profitably for the reconstruction of rotor loads and motion in the presence of corrupted or missing data. In particular, the $l_{1,2}$ or $l_{1,\infty}$ norms can be used to promote sparsity over sets of groups in a matrix, meaning that only a small number of groups would contain nonzero entries. Referring to FIG. 2, a fault in Sensor 2 on the second rotor revolution would produce a group 21 of corrupted values. The $l_{1,2}$ norm could be used with groups defined by the matrix entries for a particular sensor over a particular revolution.

Matrix completion can be used to reconstruct missing values of a load or motion matrix. This may become an important task when rotor loads and motion is captured using wireless sensors in the rotating frame. Data from wireless sensors is subject to drop-out, and thus a robust scheme for reconstruction of missing data is an important objective.

The matrix completion problem is one in which one has to recover the missing entries of a low rank matrix. It has recently been proven that most matrices W of rank m containing missing data can be perfectly recovered by solving the following optimization problem:

minimize $\|W\|_*$ subject to $W_{ij} = D_{ij}, \forall (i,j) \in \Omega$, where $\Omega$ captures the location of non-missing data $D_{ij}$, provided that the number of samples in D is sufficiently large relative to the rank m of W and the number of columns of W.

An important task is estimating rotor systems loads and motion from the aircraft state. A general linear regression model takes the form $W = UB + E$, where W is the loads and motion perturbation matrix, U is the state perturbation matrix, B is a matrix of regression coefficients, and E is the model error. The standard approach to estimating the coefficient matrix B is by means of ordinary least squares. The resulting estimates are equivalent to regressing each load on the state variables separately. Clearly such estimates may perform suboptimally since they do not utilize the information that the loads are correlated. It is also well known that this type of estimate performs poorly when the state matrix U has a rank that is low relative to the number of columns.

The following optimization problem has been proposed to solve for the low rank regression matrix B:

minimize $\|W - UB\|_F^2 + \lambda \|B\|_*$

This amounts to minimizing the squared estimation error subject to a constraint on the rank of the regression model. This optimization scheme has been justified in terms of a low-rank factor model, and the results produced by the method have been shown to be superior to those produced by other commonly used regression techniques including ordinary least squares, reduced rank regression, partial least squares, principal components regression, and ridge regression.

Once the regression matrix B has been determined, one can estimate the rotor system loads and motion using only knowledge of the aircraft state U.

Used individually or used together, the techniques of principal component pursuit, matrix completion, and nuclear-norm regularized multivariate linear regression can be used to 1) identify and correct corrupted loads and motion data, 2) reconstruct missing loads and motion data, and 3) estimate unmeasured loads and motion data using knowledge of the state of the aircraft.

FIGS. 3-8 correspond to example embodiments in which linear regime numerical analyses is performed by an analysis unit 15 receiving sensor data from sensors 12 of rotor blades and a rotor shaft 18 during the flight of a helicopter 1. The sensors 12 collect high-frequency rotor loads and motion data including pushrod loads, main rotor shaft torque and bending, servo loads, individual blade pitch, blade flap, and blade lead-lag in flight of the helicopter 1, which may include aggressive aircraft turns, pull-ups, and pushovers. The resulting loads and motion matrix has 1680 columns, corresponding to 21 loads and motion sensors each sampled at a frequency of 80 per revolution. The 21 loads and motion sensors are push rod load for rotor blade #1 ("MRPR1"), push rod load for rotor blade #2 ("MRPR2"), two measurements of main rotor shaft torque ("MRSEQ1" and "MRSEQ2"), two measurements of main rotor shaft extender bending ("MRSEBL1" and "MRSEBL2"), front servo load ("MRFLSS"), aft servo load ("MRALSS"), left servo load ("MRLSS"), stationary scissor load ("MRSTASC"), pitch of rotor blade #1 ("BL1PITCH"), pitch of rotor blade #2 ("BL2PITCH"), pitch of rotor blade #3 ("BL3PITCH"), pitch of rotor blade #4 ("BL4PITCH"), flap angle of rotor blade #1 ("BL1FLAP"), flap angle of rotor blade #2 ("BL2FLAP"), flap angle of rotor blade #3 ("BL3FLAP"), flap angle of rotor blade #4 ("BL4FLAP"), lead-lag of rotor blade #1 ("BL1LEADLAG"), lead-lag of rotor blade #2 ("BL2LEADLAG"), lead-lag of rotor blade #3 ("BL3LEADLG").

Figure 3:
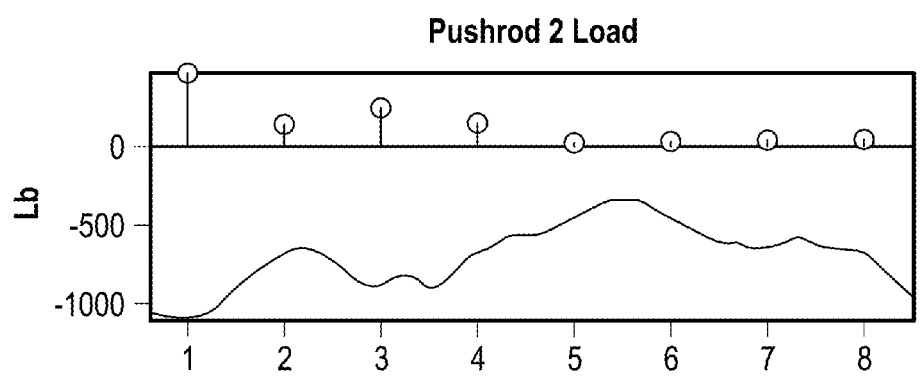
FIG. 3 illustrates a reference waveform for one load and motion sensor and motions and amplitudes of the 1-, 2-, 3-, 4-, 5-, 6-, 7-, and 8-per revolution Fourier coefficients for the waveform according to one embodiment.

A reference waveform for each load and motion is defined as the mean waveform (over one rotor revolution) for each variable. One such reference waveform, along with the amplitude of the 1-, 2-, 3-, 4-, 5-, 6-, 7-, and 8-per rev Fourier coefficients for the waveform, is shown in FIG. 3.

Figure 4:
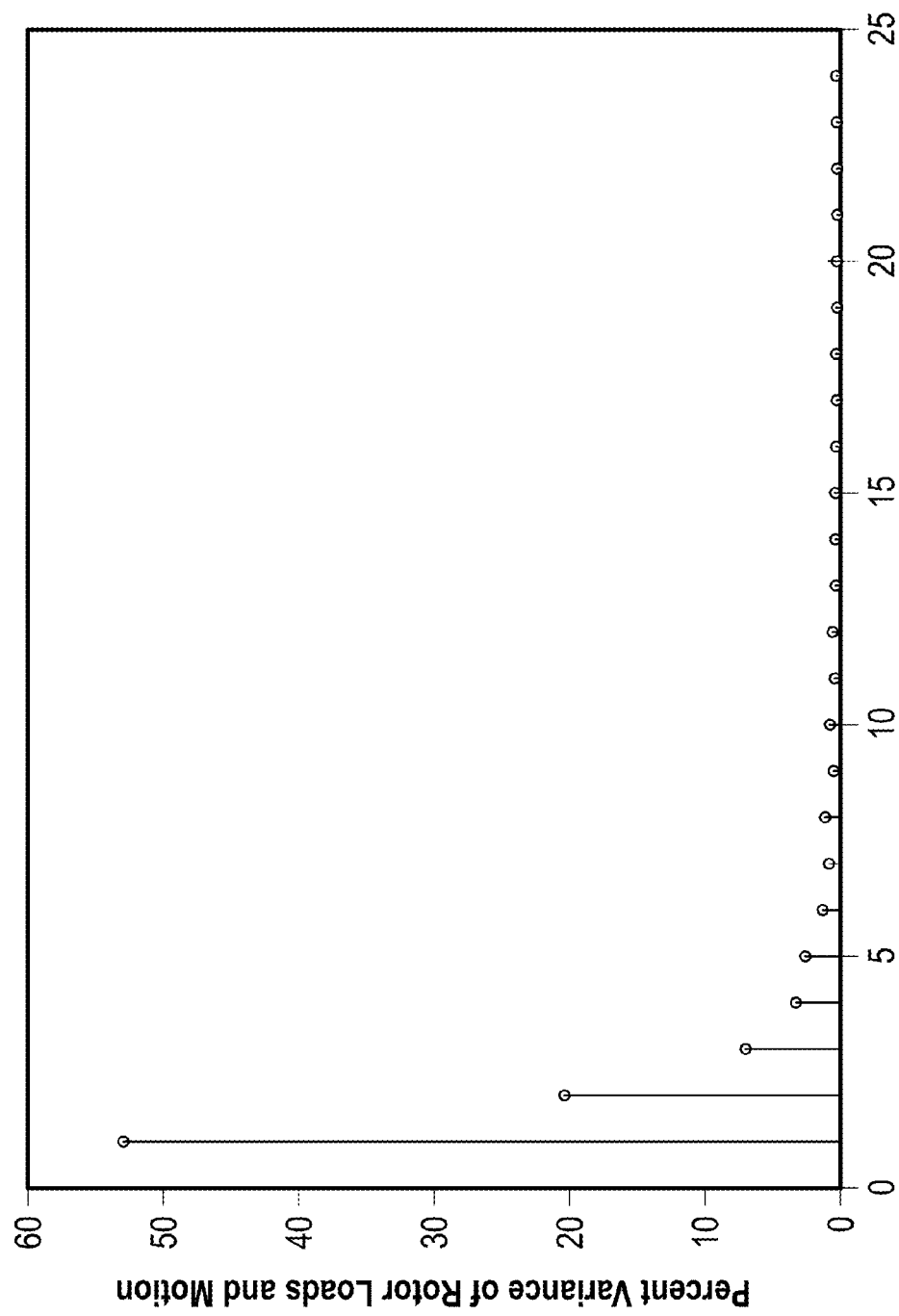
FIG. 4 illustrates a relative magnitude of twenty-five singular values of a matrix loads and motion perturbation matrix according to one embodiment.

The relative magnitude of the first 25 largest singular values of the matrix W is shown in FIG. 4. These first 25 singular values capture almost all of the variability in the data; in fact, more than 95% of the variability of loads and motion is capture with the first 10 principal components of the matrix W. This is consistent with the fact that there are approximately 25 aircraft states.

Figure 5:
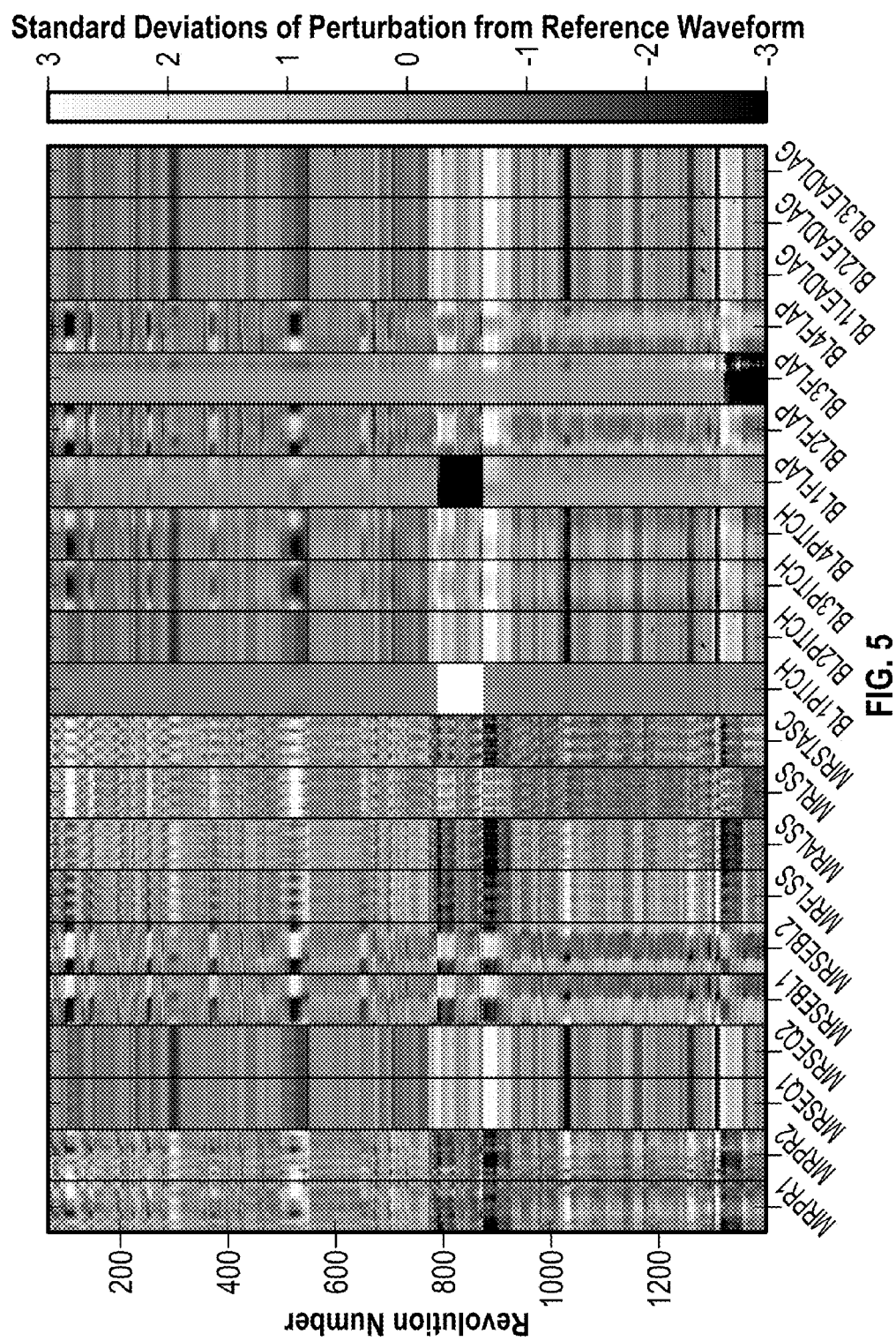
FIG. 5 illustrates low-rank loads and motion perturbation matrix according to one embodiment of the invention.

A graphical representation of the matrix W is shown in FIG. 5. The shading indicates the number of standard deviations of a load or motion from the reference waveform. Each row of the matrix corresponds to one rotor revolution. Groups of 80 measurements from a single sensor are in groups of 80 columns, as indicated by the x-axis labels.

Because the approximate rank of W is 25, and because the number of columns in the matrix is 1680, the rank of W is very low relative to its dimension. Thus it is appropriate to use principal component pursuit to decompose W as the sum of a low rank matrix L, a sparse matrix S, and a dense, low-magnitude noise matrix N.

Figure 6:
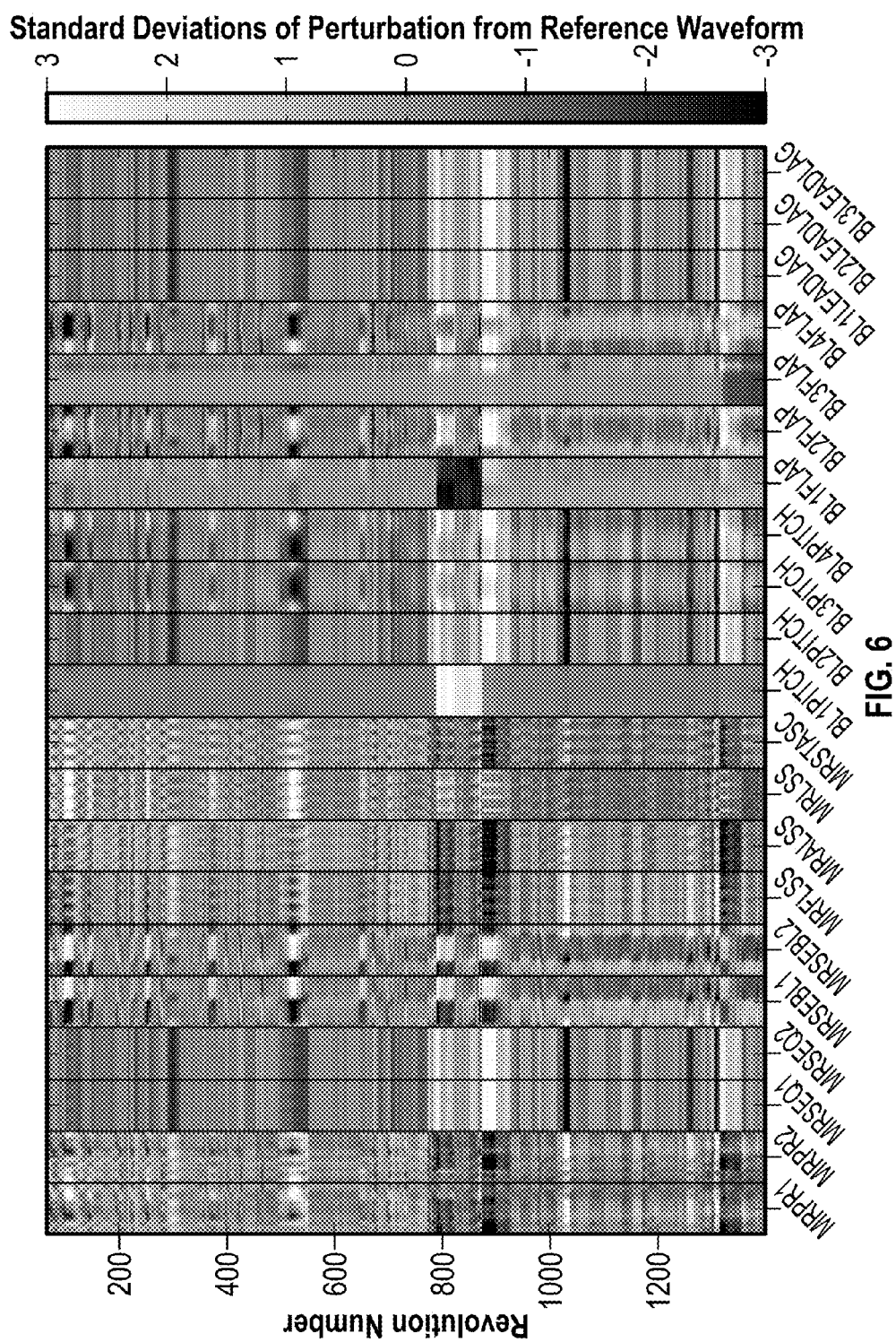
FIG. 6 illustrates a low rank loads and motion matrix according to one embodiment of the invention.
Figure 7:
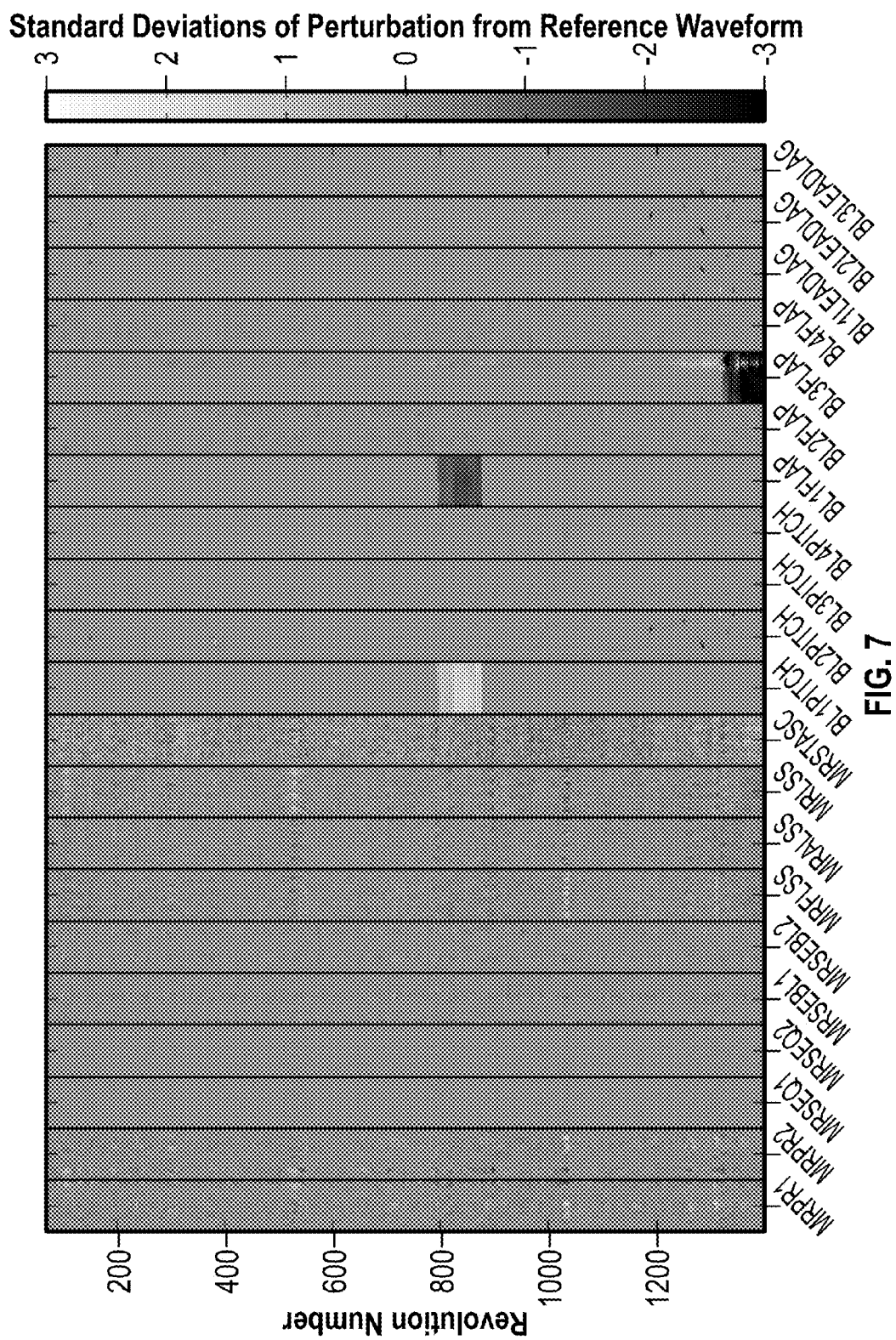
FIG. 7 illustrates a sparse outliers matrix according to one embodiment.
Figure 8:
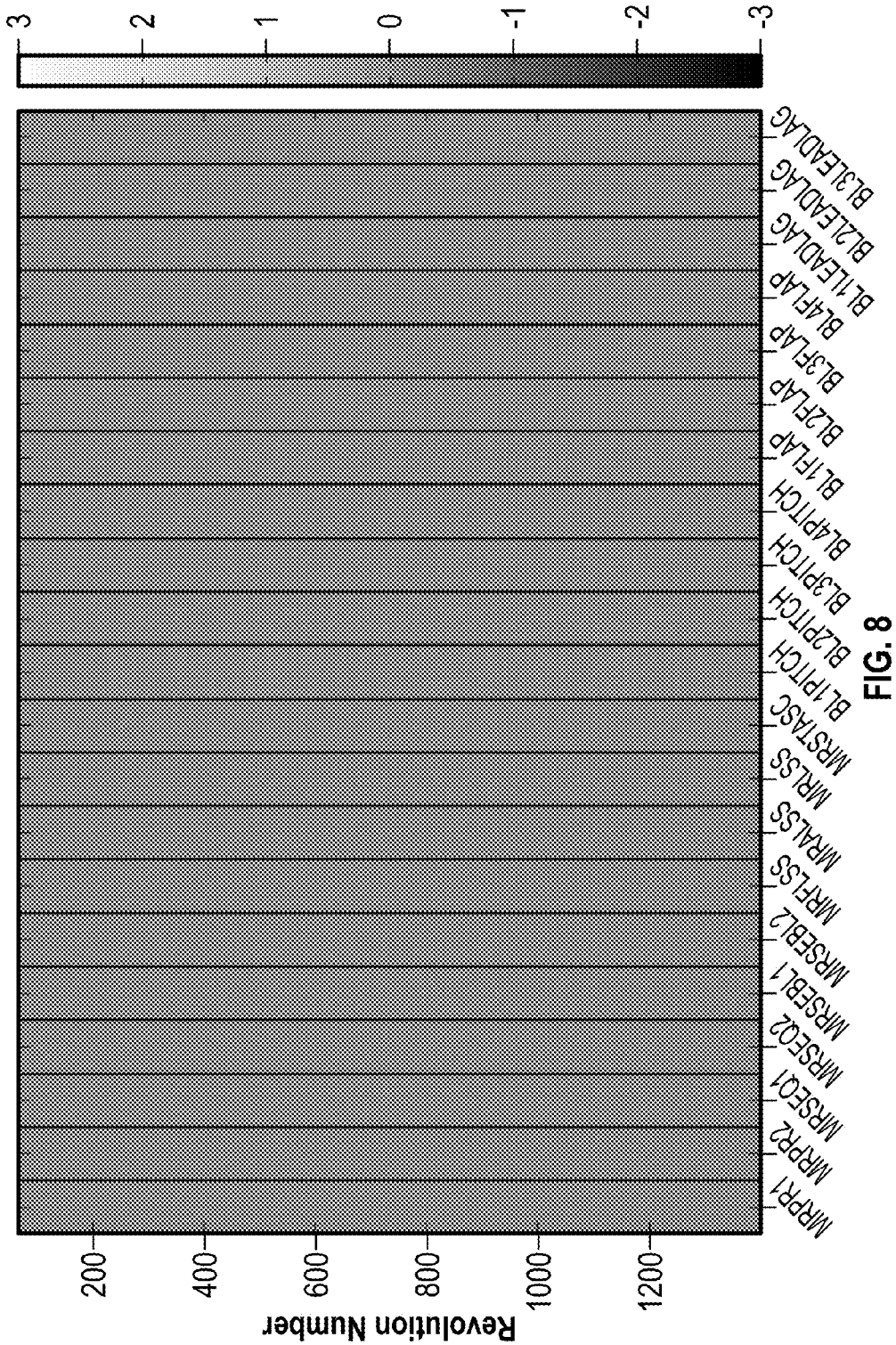
FIG. 8 illustrates a noise matrix according to one embodiment.

The low-rank matrix L is shown in FIG. 6, and the sparse matrix S is shown in FIG. 7. A low-magnitude noise matrix N is illustrated in FIG. 8. The sparse matrix S illustrates loads and motion data from the sensors 12 that corresponds to sparse outliers compared to the rest of the sensor data.

The analysis unit 15 may generate the low-rank matrix L, the sparse matrix S, and the noise matrix N by applying the principal component pursuit numerical method to the data received from the sensors 12. As a result of the principal component pursuit analysis, the analysis unit 15 may reconstruct accurate data regarding the loads and motion of the rotor blades 12 and rotor shaft 18.

In addition, according to some embodiments, the analysis unit 15 may perform matrix completion numerical methods to reconstruct data missing from the sensor data, such as data lost during wireless transmission of the data from the sensors 12 to the wireless receiver 13.

Figure 9:
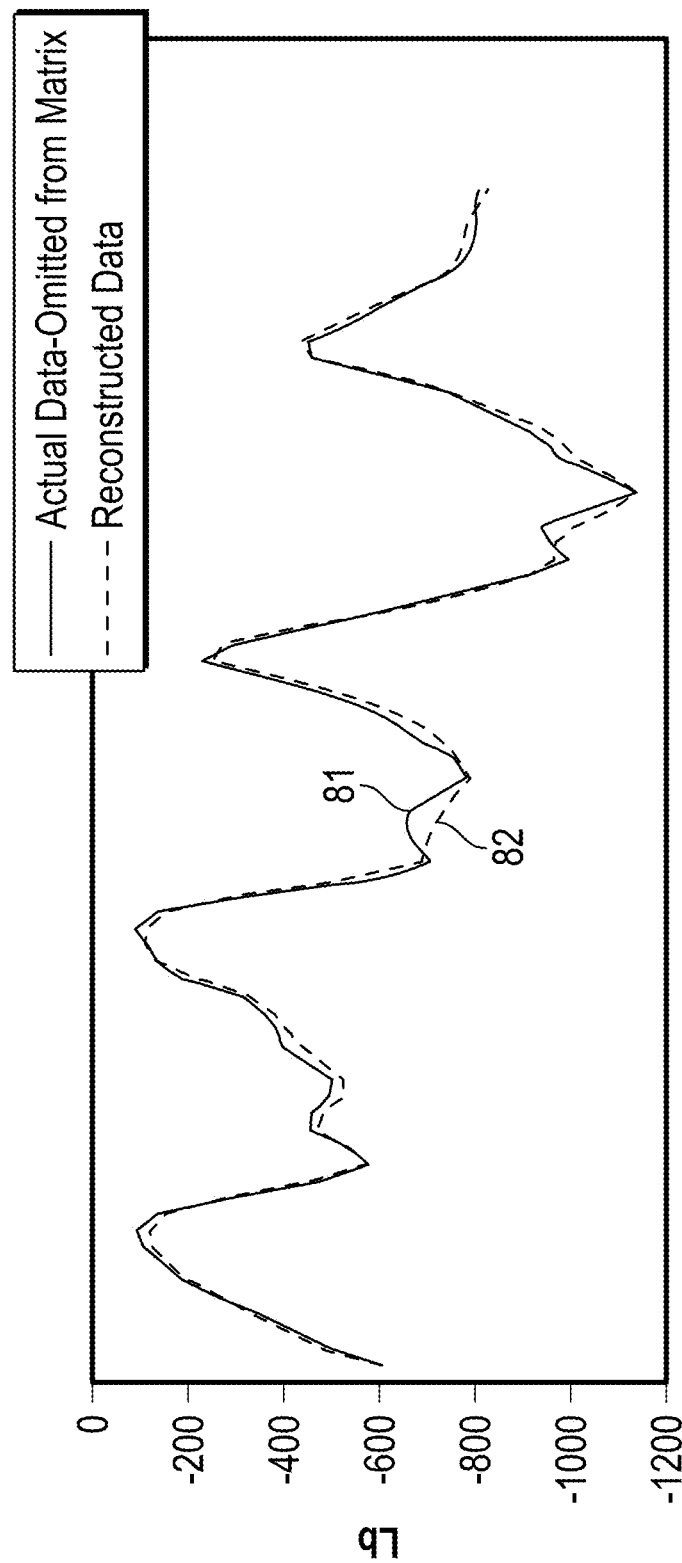
FIG. 9 is a graph illustrating reconstructed sensor data according to one embodiment of the invention.

FIG. 9 represents actual data 81 omitted from a loads and motion matrix Y during a revolution of the rotor blades 10, and reconstructed data 82 according to a matrix completion numerical methods of the sensor data. As illustrated in FIG. 9, even when significant amounts of data are omitted from the loads and motion matrix Y due, for example, to sensor data lost during transmission, the analysis unit 15 may accurately reconstruct the loads and motion data 82 to provide accurate information about the loads and motion of the rotor blades 10 and rotor shaft 18.

Figure 10:
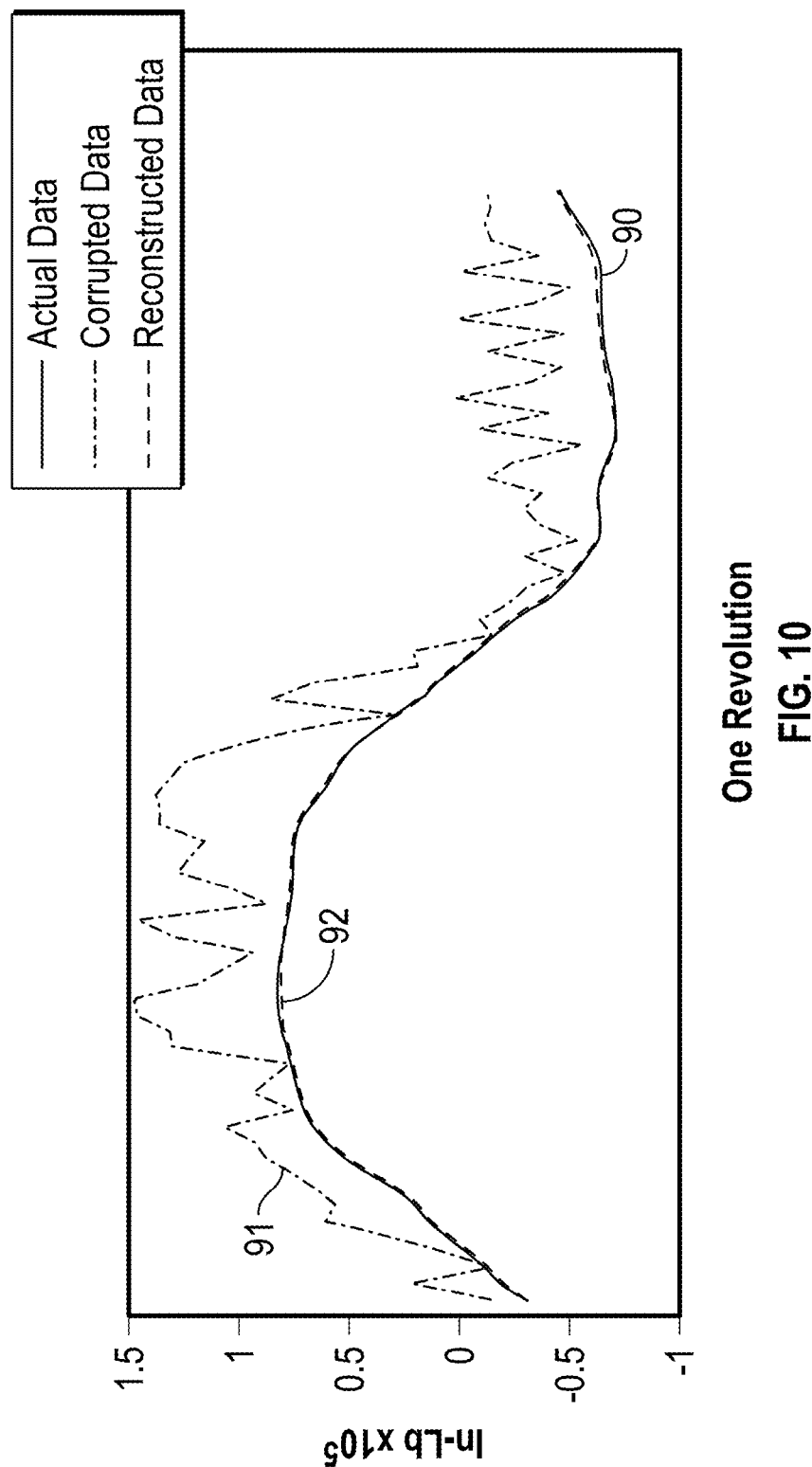
FIG. 10 is a graph illustrating reconstructed sensor data according to another embodiment of the invention.

In another embodiment, the analysis unit 15 may perform principal component pursuit numerical methods on received sensor data to recover accurate data from corrupted data, or data including a large number of errors. FIG. 10 illustrates an application of the principal component pursuit numerical methods to corrupted data 91. As illustrated in FIG. 10, by applying principal component pursuit to the corrupted data 91, the reconstructed data 92 closely tracks the actual data 90. Accordingly, by applying the principal component pursuit numerical methods, the analysis unit 15 may reconstruct sensor data that has been corrupted due to transmission error, timing errors, or by any other corrupting process.

When performing a numerical method, such as principal component pursuit, the sensor data, as well as tachometer or azimuth position data, are transmitted to the analysis unit 15. Once per main rotor revolution, data from all n loads and motion sensors is collected in a single vector, which has a length of n*p, where p is the number of samples per revolution:

$$y = [y^1, y^2, \ldots, y^n]$$

A reference waveform is subtracted to produce a loads and motion perturbation vector:

$$w = y - y_{ref} = [w^1, w^2, \ldots, w^n].$$

Some of the data may be missing and in this case the locations of the missing data in w are filled in with an arbitrary value—zero, for example. The indices for the locations of the missing data are provided to the analysis unit 15. In one embodiment, an optimization problem is formulated that will simultaneously 1) fill in missing data, 2) identify corrupted data, 3) and reconstruct missing data. The result will be a vector h, of the same length as w, that contains reconstructed, "healthy" data. The optimization problem is as follows:

$$\text{minimize } \|[h^Z]\|_* + \lambda \|f\|_1 \quad (3)$$

$$\text{subject to } \|w_{meas} - h_{meas} - f_{meas}\|_F \leq \delta$$

where $\delta$ is the Frobenius norm associated with pure sensor noise. $w_{meas}$ is the subset of the loads and motion perturbation coinciding to sensor data that is not missing, $h_{meas}$ is the subset of the low-rank reconstruction coinciding to sensor data that is not missing, and $f_{meas}$ is the subset of the sparse outlier vector coinciding to sensor data that is not missing, $\|\cdot\|_*$ is the nuclear norm, equal to the sum of the singular values of a matrix, and $\|\cdot\|_1$ is the sum of the absolute values of the entries of a vector. Z is a certain m×np matrix, where m is the number of healthy perturbation modes or number of aircraft states. Z is formed from a d×np healthy loads and perturbation matrix W, where d>>m, as follows. Let $Q \Lambda Q^T = W^T W$ be the eigenvalue decomposition of the covariance matrix of W. Then Z consists of the first m rows of $\Lambda^{1/2} Q^T$.

The first term of the optimization problem $\|[h^Z]\|_*$, ensures that the reconstructed data is consistent with the typical low-rank structure of rotor loads and motion data. The second term $\lambda \|f\|_1$ enforces the fact that sensor faults are typically sparse in the sense that an individual sensor fault affects only a small portion of the measured data. The term $(w_{meas} - h_{meas} - f_{meas})$, which is measured data minus healthy reconstruction minus the sensor fault estimate, corresponds to sensor noise and should be dense but of small magnitude.

The optimization problem (3) combines aspects of principal component pursuit and matrix completion, and is readily solved using efficient convex optimization algorithms. The computational efficiency is further enhanced by the fact that the equation (3) is a small optimization problem because it does not require the storage or computation of a large sample W of healthy loads and motion data, but only a relatively small matrix Z which has dimension m×np.

The term $\|f\|_1$ in (3) can be replaced by another suitable sparsity-inducing norm on f, such as the $l_{1,2}$ norm of the $l_{1,\infty}$ norm.

Once h is obtained from the solution of (3), a fault-free reconstruction of the loads and motion data is obtained by adding the reference waveform $y_{ref}$.

Figure 11:
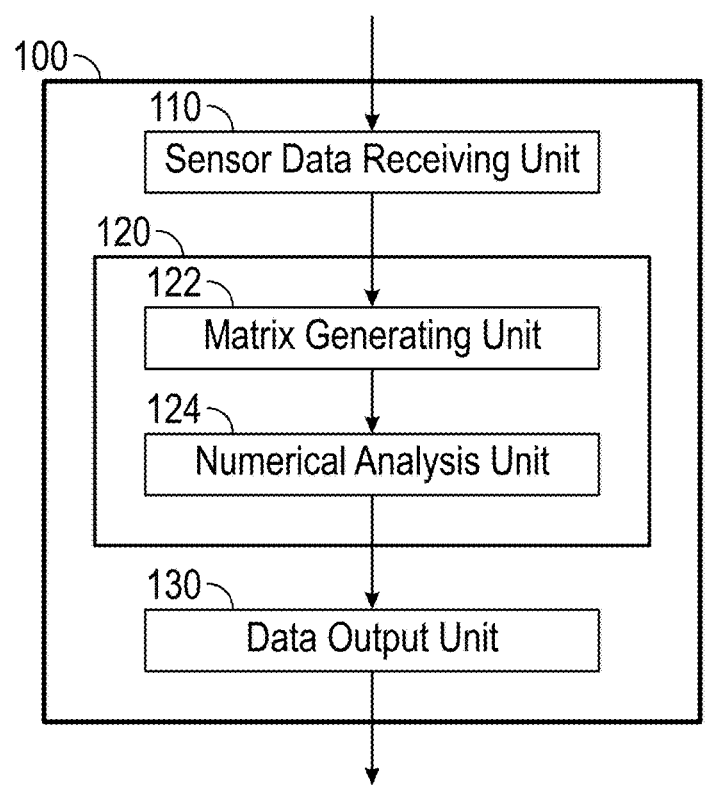
FIG. 11 is a block diagram of an analysis unit according to one embodiment of the invention.

FIG. 11 illustrates a functional block diagram of an analysis unit 100 according to an embodiment of the present invention. The analysis unit 100 may correspond to the analysis unit 15 of FIG. 1, for example.

The analysis unit 100 includes a sensor data receiving unit 110. The sensor data receiving unit 110 may include an antenna to receive sensor data wirelessly, or may include conductive leads, wires, or traces to receive the sensor data in a wired manner. The sensor data receiving unit 110 may further include processing circuitry, such as analog-to-digital converters, multiplexers, and other data processing circuitry.

The sensor data receiving unit 110 transmits the received sensor data to the sensor data reconstruction unit 120. The sensor data reconstruction unit 120 includes a matrix generating unit 122 and a numerical methods unit 124. The matrix generating unit 122 receives the sensor data and generates one or more matrices, such as the loads and motion matrix Y, discussed above, or the loads and motion perturbation matrix W, also discussed above. The matrices Y and W may include all the received sensor data for one revolution of helicopter blades 10, for example. The matrix generating unit 122 includes a data storage element, such as volatile or non-volatile memory, RAM, ROM, hard disk, or any other data storage element to store the matrix data. In addition, the data storage element includes a processor to receive the sensor data and to arrange the sensor data as a matrix in the data storage element.

The numerical methods unit 124 receives the matrix data from the matrix generating unit 122 and implements numerical analysis for a low-rank matrix to reconstruct actual loads and motion data from the received sensor data. For example, the numerical analysis unit 124 may perform one or more of principal component pursuit, matrix completion, and nuclear-norm regularized multivariate linear regression to correct errors in the received sensor data, or to provide missing sensor data. The numerical analysis unit 124 includes at least a processor and a data storage element, such as volatile or non-volatile memory, RAM, ROM, hard disk, or any other data storage element. For example, the data storage element may store numerical methods algorithms and received sensor values, and the processor may access the numerical methods algorithms, apply the algorithms to the received sensor data, and store the resulting reconstructed sensor data in the data storage element.

The sensor data reconstruction unit 120 may output the reconstructed sensor data to a data output unit 130, which may include one or more data processing elements, wired or wireless ports, or any other means to transmit the reconstructed sensor data to another device, such as a system to improve a life of helicopter components, a system to compress loads and motion data, and a system to detect and isolate of rotor-system structural faults.

Figure 12:
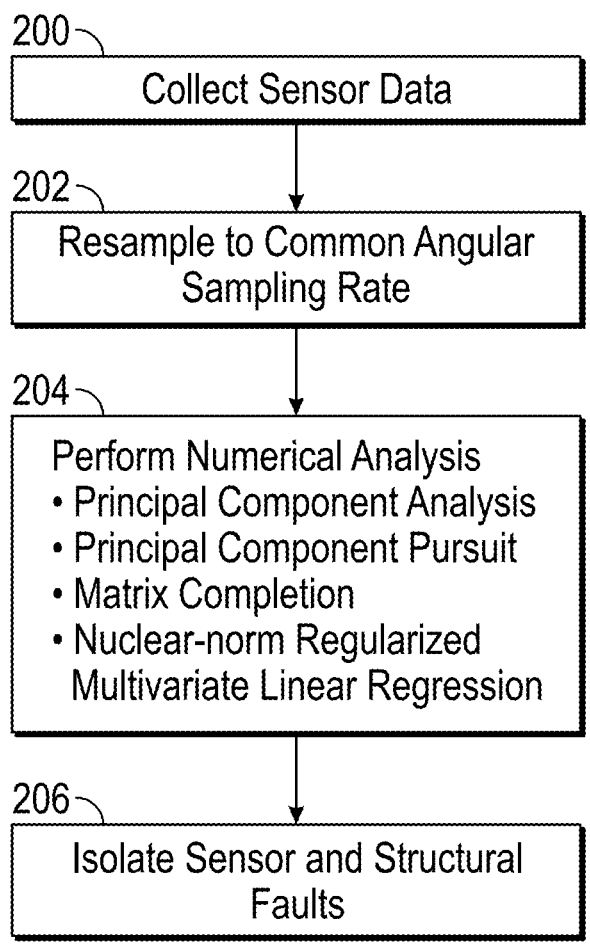
FIG. 12 is a flow diagram of a method of reconstructing sensor data according to one embodiment of the invention.

FIG. 12 is a flow diagram of a method of reconstructing sensor data according to an embodiment of the present invention. Although one particular sequence of operations is illustrated, embodiments of the present invention also correspond to methods in which the operations are performed in an alternative order, in which one or more operations are omitted, or in which alternative operations are added or substituted in the method.

In operation 200, sensor data is collected. The sensor data may correspond, for example, to a plurality of sensors 12 positioned on a rotor blade 10 and shaft 18 of a helicopter. The sensor data may be collected and organized according to each rotation of the blades 10 and shaft 18.

In one embodiment, the sensor data is resampled in operation 202 to a common angular sampling rate. In operation 204, numerical analysis for a low-rank matrix is performed, including one or more of principal component pursuit, matrix completion, and nuclear-norm regularized multivariate linear regression. The numerical methods of operation 204 may include, for example, decomposing the sensed data into fault-free data, noise, and fault data. The numerical methods of operation 204 may further result in providing an estimated sensor data that corresponds closely to actual data, such as actual loads and motion characteristics of the rotor blades 10 and shaft 18. The numerical methods may provide missing sensor data and may correct faulty sensor data to provide the estimated or reconstructed sensor data. The numerical methods may further estimate unmeasured loads and motion from the state of the aircraft or from other measured loads and motion.

In operation 206, the data from the numerical analysis, including fault data and the reconstructed loads and motion data, is used to improve operation of the helicopter, such as by isolating sensor faults, isolating structural faults, or monitoring structural usage of rotor blade 10 and shaft 18 components, etc.

Embodiments of the present invention may also be realized by a computer-readable medium that stores computer code that, when executed, performs a method of reconstructing sensor data, as illustrated in FIG. 12. The computer readable medium, or computer readable media, may include computer storage media and communication media. Computer storage media include volatile and non-volatile, removable and non-removable media implemented in any method or technology for storing information, such as computer-readable instructions, data structures, program modules, and other data. Computer storage media include, for example, RAM, ROM, EPROM, EEPROM, flash memory, and other solid state memory technology, CD-ROM, digital versatile disks (DVD), or other disk storage or magnetic storage devices, or any other medium which may be used to store information. For example, in one embodiment, the analysis unit 15 may access, or may include, the computer readable medium, and the analysis unit 15 may reconstruct sensor data having erroneous or missing data based on the process performed according to the instructions stored on the computer readable medium.

According to the above embodiments, loads and motion data of a rotating body, such as rotor blades 10 and a shaft 18 of a helicopter, may be accurately reconstructed using a linear regime for loads and motion. The sensor data may be represented as a low-rank matrix representing the sensor data of each sensor for one rotation of the rotating body. Numerical analysis, including one or more of principal component pursuit, matrix completion, and nuclear-norm regularized multivariate linear regression, may be performed on the matrix to provide missing sensor data or to correct errors in the sensor data. The reconstructed sensor data may be used to isolate sensor faults, component faults, or to perform other analysis of the system including the rotating body.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A system for reconstructing sensor data in a rotor system of a rotary wing aircraft having a number of aircraft states, comprising:
    a plurality of rotor blades of the rotor system of the rotary wing aircraft;
    a plurality of sensors mounted to each of the plurality of rotor blades, the plurality of sensors sensing at least one of loads and motion characteristics in the corresponding one of the one or more of the plurality of rotor blades and generate a number of sensor samples on each rotor revolution; and
    an analysis unit to generate, through a processor, reconstructed sensor data from the sensor data using numerical analysis for low-rank matrices, wherein the plurality of sensors are wireless sensors to transmit the sensor data from the corresponding one of the one or more of the plurality of rotor blades to the analysis unit;
    wherein the plurality of sensors includes a number of sensors with the number of sensors multiplied by the number of sensor samples for each sensor generated on each rotor revolution being greater than the number of aircraft states;
    wherein the analysis unit generates the reconstructed sensor data by generating a matrix with the sensor data and performing numerical methods for low-rank matrices, wherein the reconstructed sensor data corrects for corrupted wireless transmissions from the wireless sensors;
    wherein the analysis unit further generates a fault-free matrix, a fault matrix, and a noise matrix from the matrix generated with the sensor data;
    wherein each row of the matrix contains sensor data generated in one revolution of the rotor system for each of the plurality of sensors, and the number of rows corresponds to a plurality of revolutions of the rotor system;
    wherein each column of the matrix contains data sampled from one of the plurality of sensors at a selected rotor azimuth location;
    wherein sensor data is sampled at multiple azimuth positions through a single revolution of the rotor system; and
    a data output unit operable to output the reconstructed sensor data to fault detection system.

2. The system of claim 1, wherein the sensor data includes at least one of erroneous data and holes corresponding to missing sensor data, and
    the reconstructed sensor data includes at least one of corrected data and substitute data corresponding, respectively, to the erroneous sensor data and the missing sensor data.

3. The system of claim 1, wherein one or more of the plurality of sensor is mounted at a rotor shaft of the rotor system, and the loads and motion characteristics include at least one of blade flap, blade pitch, blade lead lag, main rotor shaft bending, main rotor shaft torque, and pitch rod loads.

4. The system of claim 1, wherein the analysis unit generates the reconstructed sensor data using at least one of principal component pursuit, matrix completion, and nuclear-norm regularized multivariate linear regression.

5. The system of claim 4, wherein a computational efficiency of an optimization problem for at least one of principal component pursuit and matrix completion is enhanced by solving an equivalent optimization problem using a relatively small, pre-determined matrix derived from a covariance matrix of a relatively large matrix of loads and motion data.

6. The system of claim 4, wherein convex optimization problems for reconstruction of missing or corrupted data include a term which induces matrix sparsity over groups of matrix entries, each group corresponding to measurements obtained from a particular sensor over a particular rotor revolution.

7. The system of claim 1, wherein the analysis unit is configured to isolate at least one of a sensor fault and a structural fault in the rotor system using at least one of the fault-free matrix, the fault matrix, and the noise matrix.

8. The system of claim 1, wherein data collected from the plurality of sensors for determining loads and motion characteristics is collected from a selected linear regime.

9. A method of reconstructing sensor data of a rotor system of a rotary wing aircraft having a number of aircraft states, comprising:
    collecting sensor data from a plurality of wireless sensors mounted to a rotor blade of the rotor system of the rotary wing aircraft, wherein collecting sensor data includes receiving the sensor data via a wireless receiver; and
    generating, through a processor of an analysis unit, reconstructed loads and motion data of the rotor blade by applying numerical methods for low-rank matrices to the sensor data, wherein the reconstructed loads and motion data correct for corrupted wireless transmissions from the wireless sensors;
    generating through the processor of the analysis unit a fault-free matrix, a fault matrix, and a noise matrix from the matrix generated with the sensor data;
    wherein the plurality of sensors includes a number of sensors with the number of sensors multiplied by the number of sensor samples for each sensor generated on each rotor revolution being greater than the number of aircraft states;
    wherein generating, though the processor of the analysis unit, reconstructed loads and motion data of the rotor blade includes generating, through the processor, a matrix with the sensor data from the sensors and performing the numerical methods on the matrix;
    wherein each row of the matrix contains sensor data generated in one revolution of the rotor system for each of the plurality of wireless sensors, and the number of rows corresponds to a plurality of revolutions of the rotor system;
    wherein each column of the matrix contains data sampled from one of the plurality of sensors at a selected rotor azimuth location;
    wherein sensor data is sampled at multiple azimuth positions through a single revolution of the rotor system; and wherein generating the reconstructed loads and motion data includes outputting the reconstructed loads and sensor data to a fault detection system.

10. The method of claim 9, wherein the sensor data includes at least one of faulty sensor data and holes corresponding to missing sensor data, and generating, through the processor, reconstructed loads and motion data of the rotor blade includes applying the numerical methods to provide at least one of corrected values to remedy the faulty sensor data and replacement values to remedy the holes.

11. The method of claim 9, wherein the numerical methods include at least one of principal component pursuit, matrix completion, and nuclear-norm regularized multivariate linear regression.

12. The method of claim 11, wherein a computational efficiency of an optimization problem for at least one of principal component pursuit and matrix completion is enhanced by solving an equivalent optimization problem using a relatively small, pre-determined matrix derived from a covariance matrix of a relatively large matrix of loads and motion data.

13. The method of claim 11, wherein convex optimization problems for reconstruction of missing or corrupted data include a term which induces matrix sparsity over groups of matrix entries, each group corresponding to measurements obtained from a particular sensor over a particular rotor revolution.

14. The method of claim 9, further comprising using the reconstructed loads and motion data to perform at least one of isolating sensor faults and identifying structural faults in the rotor system.

15. The method of claim 9, further comprising: collecting data from a selected linear regime of the plurality of sensors to determine load and motion characteristics.

* * * * *